US009837683B2

(12) United States Patent
Lundström

(10) Patent No.: US 9,837,683 B2
(45) Date of Patent: Dec. 5, 2017

(54) BATTERY PACK

(75) Inventor: Dag Lundström, Onsala (SE)

(73) Assignee: ALELION ENERGY SYSTEMS AB, Mölndal (SE)

( * ) Notice: Subject to any disclaimer, the term of this patent is extended or adjusted under 35 U.S.C. 154(b) by 145 days.

(21) Appl. No.: 14/389,306

(22) PCT Filed: Mar. 30, 2012

(86) PCT No.: PCT/SE2012/050356
§ 371 (c)(1),
(2), (4) Date: Sep. 29, 2014

(87) PCT Pub. No.: WO2013/147659
PCT Pub. Date: Oct. 3, 2013

(65) Prior Publication Data
US 2015/0104683 A1    Apr. 16, 2015

(51) Int. Cl.
*H01M 10/42* (2006.01)
*H01M 10/613* (2014.01)
(Continued)

(52) U.S. Cl.
CPC ..... *H01M 10/0525* (2013.01); *H01M 2/0207* (2013.01); *H01M 2/0217* (2013.01);
(Continued)

(58) Field of Classification Search
CPC .......... H01M 10/647; H01M 10/0585; H01M 10/425; H01M 10/4257; H01M 10/0413;
(Continued)

(56) References Cited

U.S. PATENT DOCUMENTS 6,225,778 B1 *  5/2001  Hayama .............. H01M 2/1061
                                                            320/112
7,479,786 B2     1/2009  Woo et al.
(Continued)

FOREIGN PATENT DOCUMENTS

DE    102009035469 A1    2/2011
EP         2290733 A1    3/2011
(Continued)

OTHER PUBLICATIONS

English Translation of Japanese Office Action for Japanese Application No. 2015-503153 dated Mar. 7, 2016 in 2 pages.
(Continued)

*Primary Examiner* — Jonathan Jelsma
(74) *Attorney, Agent, or Firm* — Knobbe, Martens, Olson & Bear, LLP

(57) ABSTRACT

The invention concerns a battery pack (1), comprising a plurality of electrically connected battery cells (2), wherein the battery cells (2) are substantially flat with two opposite sides (2a, 2b) and a peripheral edge (2c), and wherein the battery cells (2) are arranged side by side as to form a layered structure, and an electronic arrangement configured to monitor and control the battery cells (2). The invention is characterized in that the electronic arrangement comprises a plurality of individual electronic circuit units (30), each of which being associated with a corresponding battery cell (2), wherein each of the electronic circuit units (30) is configured to be capable of monitoring and controlling its corresponding battery cell (2), and wherein each electronic circuit unit (30) is arranged on a thin and flexible circuit carrying sheet (3) that is arranged at one of the sides (2a, 2b) of the corresponding battery cell (2). The invention also concerns a method for manufacturing of a battery pack (1).

30 Claims, 9 Drawing Sheets

(51) Int. Cl.
*H01M 10/0525* (2010.01)
*H01M 2/02* (2006.01)
*H01M 10/0585* (2010.01)
*H01M 10/655* (2014.01)
*H01M 10/647* (2014.01)
*H01M 10/04* (2006.01)
*H01M 10/625* (2014.01)
*H01M 10/6555* (2014.01)
*H01M 10/6557* (2014.01)

(52) U.S. Cl.
CPC ... *H01M 10/0413* (2013.01); *H01M 10/0585* (2013.01); *H01M 10/425* (2013.01); *H01M 10/4257* (2013.01); *H01M 10/613* (2015.04); *H01M 10/625* (2015.04); *H01M 10/647* (2015.04); *H01M 10/655* (2015.04); *H01M 10/6555* (2015.04); *H01M 10/6557* (2015.04); *H01M 2010/4271* (2013.01); *H01M 2220/20* (2013.01); *Y10T 29/49108* (2015.01); *Y10T 29/49114* (2015.01)

(58) Field of Classification Search
CPC ....... H01M 2010/4271; H01M 2/0207; H01M 2/0217; H01M 10/613; H01M 10/655; H01M 10/6555
See application file for complete search history.

(56) References Cited

U.S. PATENT DOCUMENTS

| | | |
|---|---|---|
| 2004/0009334 A1 | 1/2004 | Miyamoto et al. |
| 2007/0009794 A1* | 1/2007 | Takami ................ H01M 2/021 |
| | | 429/184 |
| 2009/0154048 A1* | 6/2009 | Jang ....................... H01M 2/30 |
| | | 361/106 |
| 2010/0092805 A1* | 4/2010 | Jang ..................... H01M 2/1061 |
| | | 429/7 |
| 2011/0162820 A1* | 7/2011 | Weber ................. H01M 10/052 |
| | | 165/104.19 |
| 2011/0274956 A1 | 11/2011 | Lin et al. |
| 2011/0318632 A1 | 12/2011 | Herrmann et al. |
| 2012/0133521 A1* | 5/2012 | Rothkopf ............. G01R 31/024 |
| | | 340/636.1 |
| 2012/0194135 A1* | 8/2012 | Mizoguchi ............ H02J 7/0016 |
| | | 320/118 |
| 2012/0242144 A1* | 9/2012 | Chorian .................. H01M 2/34 |
| | | 307/9.1 |
| 2013/0004811 A1* | 1/2013 | Banerjee ................. G01K 7/16 |
| | | 429/62 |
| 2013/0244062 A1* | 9/2013 | Teramoto .......... H01M 10/4257 |
| | | 429/7 |
| 2013/0302651 A1* | 11/2013 | Kim ....................... H05K 1/148 |
| | | 429/7 |

FOREIGN PATENT DOCUMENTS

| | | |
|---|---|---|
| EP | 2416435 A1 | 2/2012 |
| JP | 2004-273351 | 9/2004 |
| JP | 2007-503690 | 2/2007 |
| JP | 2010-507198 | 3/2010 |
| JP | 2011111107 A | 6/2011 |
| JP | 2011-146320 | 7/2011 |
| JP | 2011-249015 | 12/2011 |
| WO | WO 2005/060025 | 6/2005 |
| WO | WO 2008/048751 | 4/2008 |

OTHER PUBLICATIONS

International Search Report for PCT/SE2012/050356, dated Dec. 18, 2012, in 5 pages.

* cited by examiner

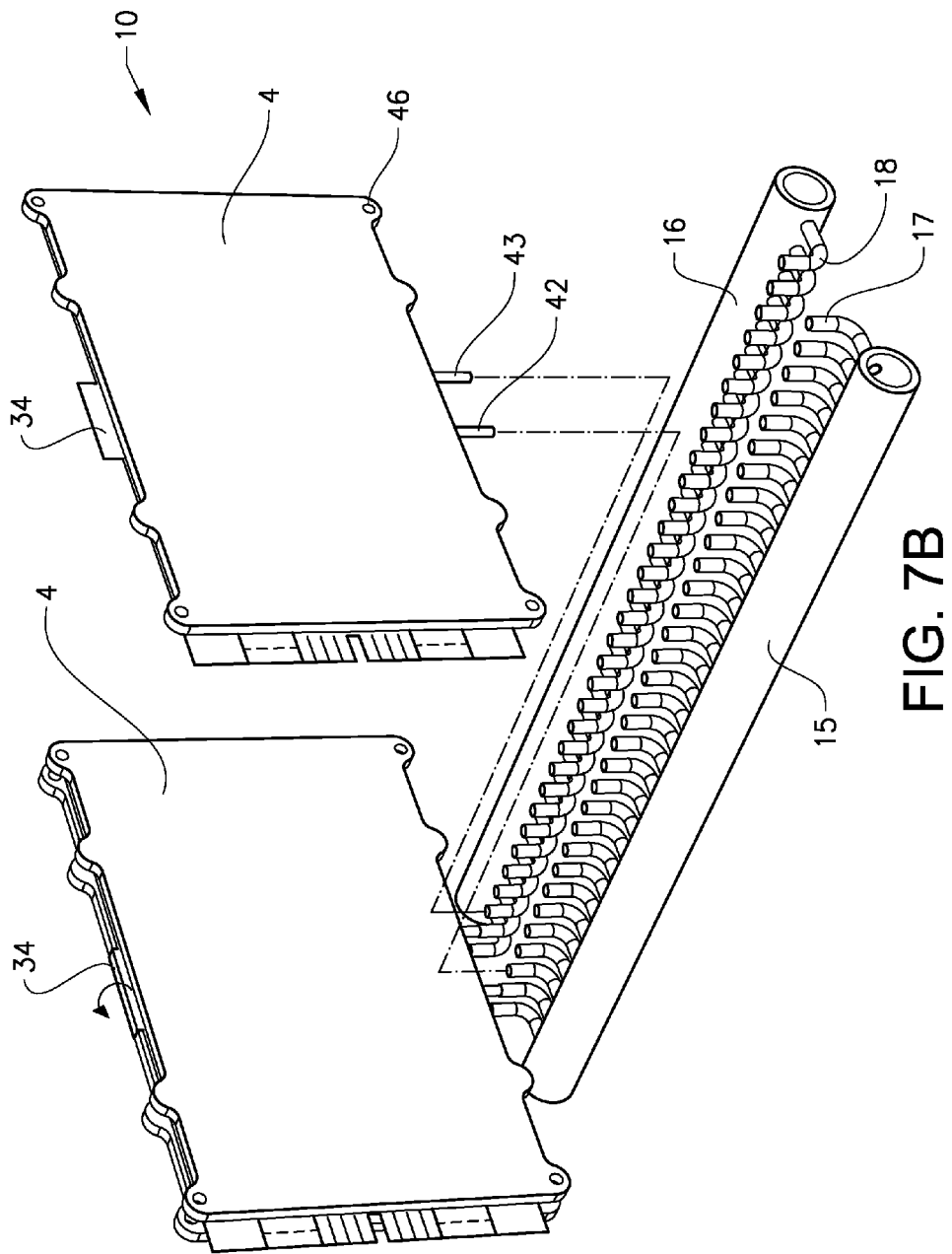

BATTERY PACK

TECHNICAL FIELD

This invention relates to a rechargeable battery pack for use as electrical power source in, for instance, electrical or hybrid vehicle applications. The invention also relates to a method for manufacturing of such a battery pack.

BACKGROUND OF THE INVENTION

There is a general need for efficient rechargeable battery packs for use as electrical power source in, for instance, electrical or hybrid vehicle applications. Besides being capable of delivering an adequate electrical power, such battery packs must be safe with regard to operation and re-charging, and ideally they should further have a long-time durability and re-chargeability, occupy as little space as possible, allow for an easy and cost-effective production, etc.

Typically, such battery packs contain a number of battery cells connected in series and/or parallel, an electronic arrangement for monitoring and controlling the cells, and a system for cooling the cells. The electronic arrangement typically includes a PCB (printed circuit board) connected to the cells and a BMS (battery management system) capable of balancing the cells and estimating the state of charge (SOC). Commonly, thin and flat (prismatic) Li-ion type cells are used.

U.S. Pat. No. 7,479,786 is directed to a member for measurement of cell voltage and temperature in a battery pack and discloses a design where a specially shaped PCB is electrically connected to serially connected unit cells as well as to temperature measuring elements attached to the surfaces of the unit cells. The PCB is further connected to a central BMS at which voltage and temperature measuring devices are mounted. An advantage of this design is stated to be the reduced need of external wiring members for connecting the cells to the voltage and temperature measuring devices.

US 2011/0274956 shows another example of a battery pack including sandwiched flat cells and cooling fins where a weld-free, frameless battery stack design is disclosed. This design is stated to simplify assembling and dissembling of the battery pack. No particular solution is disclosed regarding the electronic arrangement.

No fully satisfying battery pack for e.g. electrical or hybrid vehicle applications appears yet to have been presented so there is still a need for improvements.

SUMMARY OF THE INVENTION

An object of this invention is to provide a battery pack of the above type that has a more compact and simple structure compared to conventional battery packs and that allows for an efficient and flexible manufacturing. This object is achieved by the battery pack defined by the technical features contained in independent claim 1. Another object is to provide an improved method of manufacturing a battery pack. The dependent claims contain advantageous embodiments, further developments and variants of the invention.

The invention concerns a battery pack comprising a plurality of electrically connected battery cells, wherein the battery cells are substantially flat with two opposite sides and a peripheral edge, and wherein the battery cells are arranged side by side as to form a layered structure, and an electronic arrangement configured to monitor and control the battery cells.

The invention is characterized in that the electronic arrangement comprises a plurality of individual electronic circuit units, each of which being associated with a corresponding battery cell, wherein each of the electronic circuit units is configured to be capable of monitoring and controlling its corresponding battery cell, and wherein each electronic circuit unit is arranged on a thin and flexible circuit carrying sheet that is arranged at one of the sides of the corresponding battery cell.

A battery pack design according to the invention has several advantages. The use of individual electronic circuit units dispenses with the need of arranging a central BMS as well as of arranging connection members required for connecting sensors etc. with such a central BMS. Further, using such intelligent electronics distributed at each battery cell provides for the possibility of letting the individual electronic circuit units communicate with each other, for instance via a bus member or superimposed on the power connections between the cells, so as to form a distributed BMS.

The circuit carrying sheet can, for instance, be a flexible film having a layer provided with electronic circuits and components, terminals, sensors, cupper connectors etc. covered with a protective layer. To arrange electronic circuits on flexible films as to form "flexi-PCB's" is known as such. How to make an electronic circuit unit capable of monitoring and controlling a battery cell is also known as such. The thin, flexible sheet can be provided with a self-adhesive layer and simply be attached to the flat side of the cell. A part of the sheet including part of the electronic circuit unit can extend outside an edge of the cell so as to simplify electric connection to the electronic circuit unit. Preferably, the sheet extends over a considerable portion of the side of the cell so that a temperature sensor forming part of the circuit unit can be positioned approximately in the middle of the cell or so that several temperature sensors can be distributed over the side of the cell. A sheet that extends over the side of the cell also allows further components to be included in the electronic circuit unit.

Besides attaching the sheet by adhesive means, the electronic circuit unit may form an integrated part of the battery cell, i.e. the sheet containing the electronic circuit unit may form an integrated part of the cell. For instance, the electronic circuit unit may be arranged in a cell protection cover or be arranged inside of such a cover. A further possibility is to simply clamp the sheet between two cells or other components of the battery stack and hold it in place simply by friction. Electric connection between the circuit unit and the anode and cathode of the corresponding cell can be arranged in different ways. Sensitive parts of the electronic circuit unit, such as a control unit including a CPU or an ASIC, are preferably positioned in such a way as to avoid getting pressed together (too much) between its corresponding cell and an adjacent part of the battery pack, for instance by providing a depression in the surface of the cell or the adjacent part at a position corresponding to that of the sensitive electronic parts.

A further advantage of positioning the flexible sheets between the battery cells is that it makes the battery pack more tolerant towards impacts and vibrations. Since the sheet is thin it still allows cooling of the battery cell from both sides, for instance by incorporating flat cooling plates between the cells.

By arranging electronic circuit units of the type described above on the side of each battery cell manufacturing of the battery pack is simplified because there is no need to install any stiff conventional PCB's, cables or other external electronic equipment at the cells for the purpose of establishing a connection from the cells to a central BMS or temperature measurement device. Thus, the use of individual electronic circuit units arranged on thin, flexible sheets arranged at the cell sides provides for an efficient manufacturing of a compact and space-saving battery pack. Further, the manufacturing becomes flexible in that it is possible to select and connect a suitable, optional number of battery cells units to each other.

In an embodiment of the invention the battery pack comprises a plurality of cooling plates arranged as layers between battery cells in the layered structure. Preferably, the battery pack comprises a plurality of repeating battery pack units, each battery pack unit forming a layered structure comprising one of said battery cells, one of said circuit carrying sheets and one of said cooling plates. Such a battery pack can be cooled efficiently and provides for an efficient manufacture.

In an embodiment of the invention the cooling plates are provided with an internal cooling channel with an inlet and an outlet, wherein the inlet is connected to a cooling medium supply and wherein the outlet is connected to a cooling medium discharge.

In an embodiment of the invention each cooling plate is provided with a plurality of through-holes positioned outside of the peripheral edge of the battery cells, wherein a connection rod extends through corresponding through-holes of the cooling plates from a first end of the battery pack to a second end, wherein a locking device at each of said ends of the battery pack is arranged to hold the connection rod in place and to press the layers together in the battery pack. This arrangement holds the battery pack together and provides for an efficient assembling of the pack.

In an embodiment of the invention each battery cell comprises a cell anode and a cell cathode, wherein first and second foldable cell power tabs are connected to the cell anode and cathode, respectively, wherein said cell power tabs protrude at the edge of the battery cell. Such power tabs can easily be folded and fixed, e.g. by welding, after assembling of the battery pack. Preferably, the foldable cell power tabs are folded and connected to adjacent cells as to connect the battery cells electrically to each other.

In an embodiment of the invention each battery cell comprises a cell anode and a cell cathode, wherein each of the electronic circuit units is electrically connected to the cell anode and cathode of its corresponding cell. Each electronic circuit unit is capable of measuring the voltage and the temperature of the corresponding battery cell as well as of controlling the operation of the corresponding cell based on the voltage and temperature measurements.

In an embodiment of the invention each electronic circuit unit comprises a control unit and at least one temperature sensor connected to the control unit, wherein the control unit is capable of measuring the voltage and the temperature of the corresponding battery cell as well as of controlling the operation of the corresponding cell based on the voltage and temperature measurements.

In an embodiment of the invention the circuit carrying sheet extends over the side of the battery cell, wherein the control unit is arranged in the vicinity of the edge of the battery cell whereas the temperature sensor is arranged at a distance from the control unit in a central region of the battery cell. This gives easy access to the control unit whereas the temperature sensor is positioned where a higher temperature can be expected.

In an embodiment of the invention each electronic circuit unit comprises a controllable heating member capable of heating the corresponding cell. This is useful in applications where there is a risk that the temperature is too low.

In an embodiment of the invention each electronic circuit unit comprises a resistive balance circuit, wherein the electronic circuit unit is configured such that an electric current from the corresponding battery cell can be tapped off via the resistive balance circuit such as to lower the voltage of the cell. This way passive balancing can be performed. Preferably, the resistive balance circuit is arranged in a resistive balance tab that protrudes at an edge of the circuit carrying sheet, wherein the resistive balance tab is folded around an edge of an adjacent cooling plate. This provides for an efficient cooling of the resistive balance circuit which in turn provides for an efficient balancing.

In an embodiment of the invention the electronic circuit units are connected such as to allow communication between the electronic circuit units of the battery pack. By allowing such a communication no central control unit is required. Instead, each electronic circuit unit can communicate with all other electronic circuit unit and can thereby receive information on the other cells as well as send information on its associated cell to the other electronic circuit units. Predetermined action routines in each of the electronic circuit units for controlling the associated cell can thus be based on the conditions of all cells in the battery pack. Such a BMS may be denoted a distributed BMS.

In an embodiment of the invention each circuit carrying sheet comprises first and second foldable communication tabs connected to the corresponding electronic circuit unit, wherein said communication tabs protrude at an edge of the circuit carrying sheet, wherein the communication tabs are folded and connected to adjacent electronic circuit units. This is a suitable way of achieving such an internal communication between the electronic circuit units.

In an embodiment of the invention the electronic circuit unit comprises a pressure sensor. This can be used to detect cell-expansion and possible malfunction at an early stage.

In an embodiment of the invention electrical power connections to each electronic circuit unit are arranged both from its corresponding battery cell as well as from at least one additional battery cell. This way the electronic circuit unit of a particular cell can still function even if its associated cell does not provide it with sufficient power.

In an embodiment of the invention the circuit carrying sheet has substantially the same size as its corresponding battery cell. This way various components of the electronic circuit unit can be distributed properly over the side of the cell.

In an embodiment of the invention the circuit carrying sheet is attached to its corresponding battery cell by adhesive means. Preferably, the sheet is provided with a self-adhesive layer. This simplifies manufacture.

In an embodiment of the invention the cells are of the Li-ion type with a capacity of at least 1 Ah each.

The invention also concerns a method for manufacturing of a battery pack comprising: a plurality of electrically connected battery cells, wherein the battery cells are substantially flat with two opposite sides and a peripheral edge; and a plurality of cooling plates, wherein the battery cells and the cooling plates are arranged side by side as to form a layered structure, said battery pack further comprising an electronic arrangement configured to monitor and control the battery cells.

The method is characterized in that it comprises the steps of: forming a plurality of repeating battery pack units, wherein each battery pack unit forms a layered structure comprising one of said battery cells, one of said cooling plates and a thin and flexible circuit carrying sheet arranged at one of the sides of a corresponding battery cell, said circuit carrying sheet comprising an electronic circuit unit being capable of monitoring and controlling its corresponding battery cell; and assembling said plurality of repeating battery pack units as to form the battery pack.

In embodiments of the inventive method it comprises one or several of the following steps:
- attaching the circuit carrying sheet to the corresponding battery cell by adhesive means;
- connecting the electronic circuit unit to the corresponding battery cell by connecting first and second power connection tabs, that form part of the electronic circuit unit and the circuit carrying sheet, with foldable first and second foldable cell power tabs that are connected to a cell anode and a cell cathode, respectively;
- establishing a communication arrangement allowing the electronic circuit units in the battery pack to communicate with each other;
- connecting first and second foldable communication tabs that protrude at an edge of the circuit carrying sheet to corresponding communication tabs of adjacent electronic circuit units.

BRIEF DESCRIPTION OF DRAWINGS

In the description of the invention given below reference is made to the following figure, in which:

FIG. 7B shows a further step of the process of assembling a battery pack according to FIG. 1.

DESCRIPTION OF EXAMPLE EMBODIMENTS OF THE INVENTION

Figure 1:
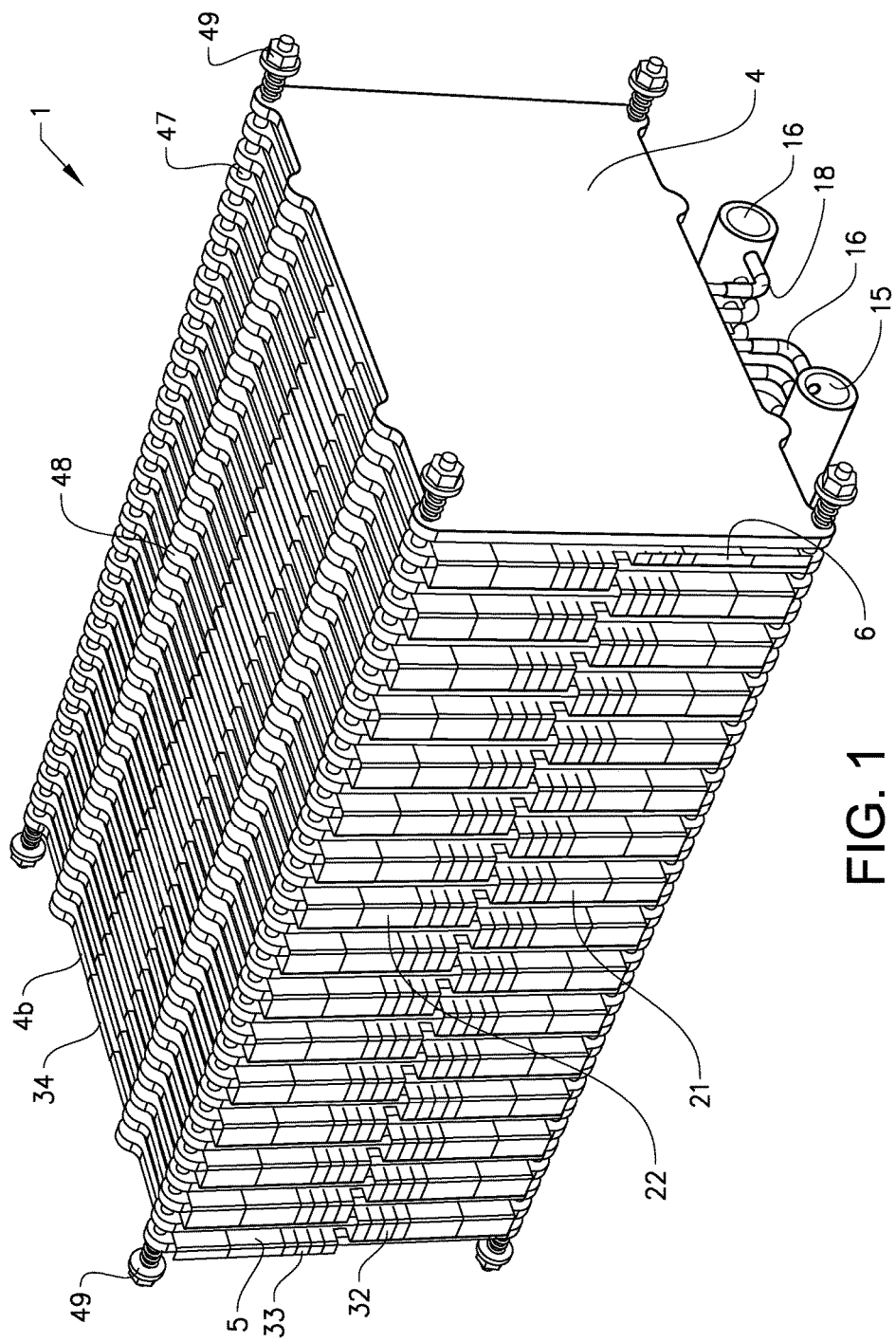
FIG. 1 shows, in a perspective view, a front side of a first embodiment of a battery pack according to the invention.
Figure 2:
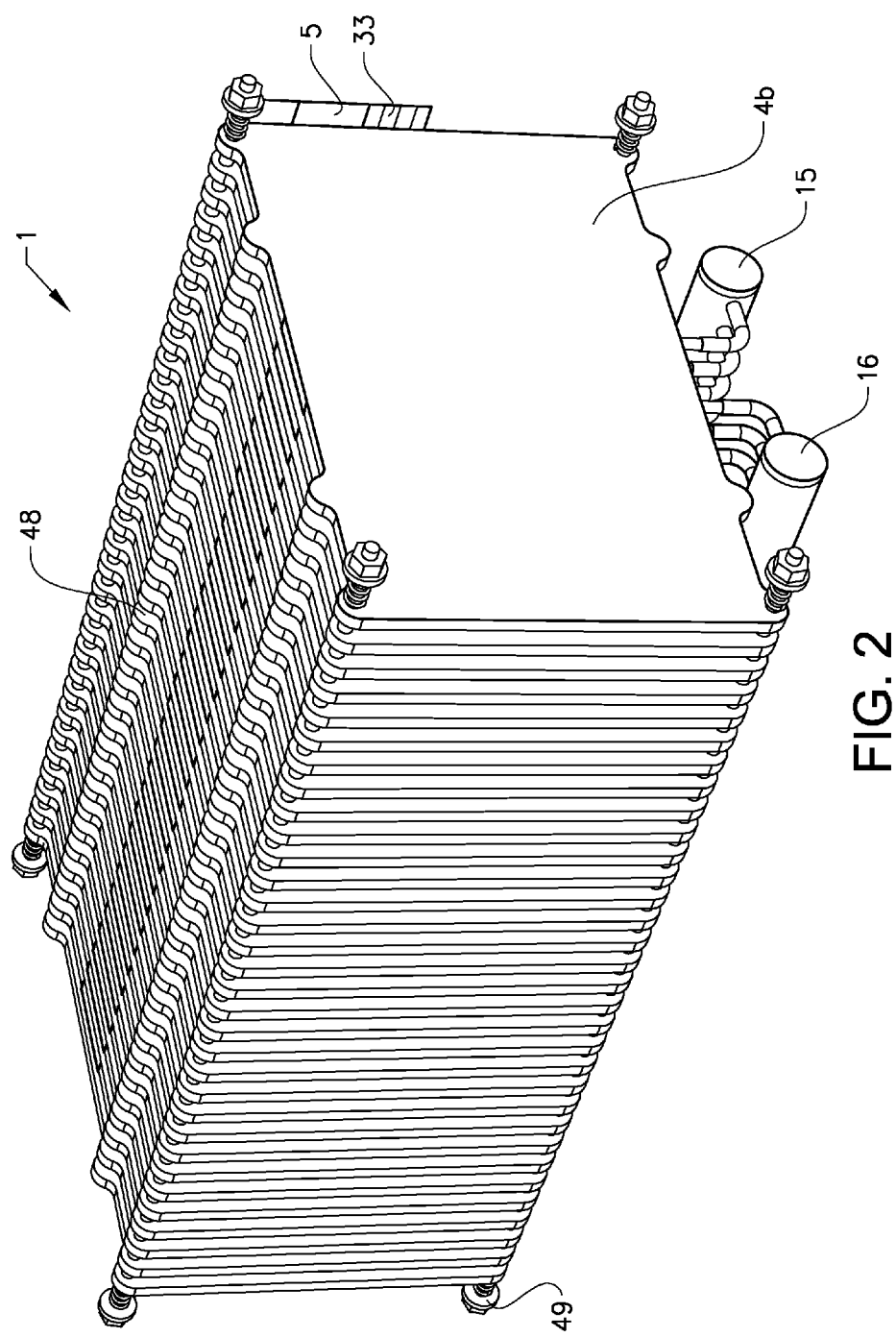
FIG. 2 shows, in a perspective view, a rear side of the battery pack according to FIG. 1.
Figure 3:
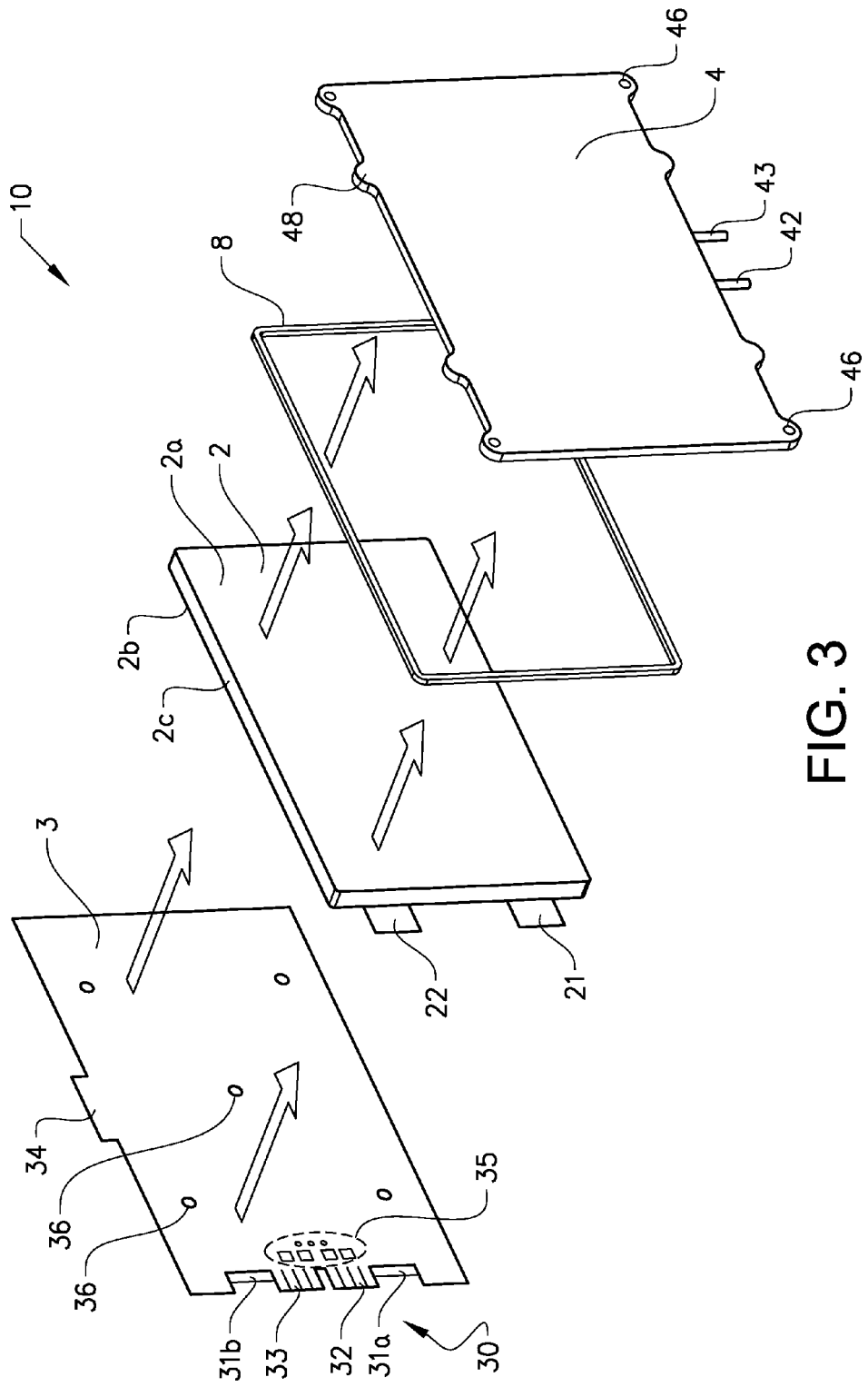
FIG. 3 shows the parts forming part of a repeating battery pack unit of the battery pack shown in FIG. 1.
Figure 4:
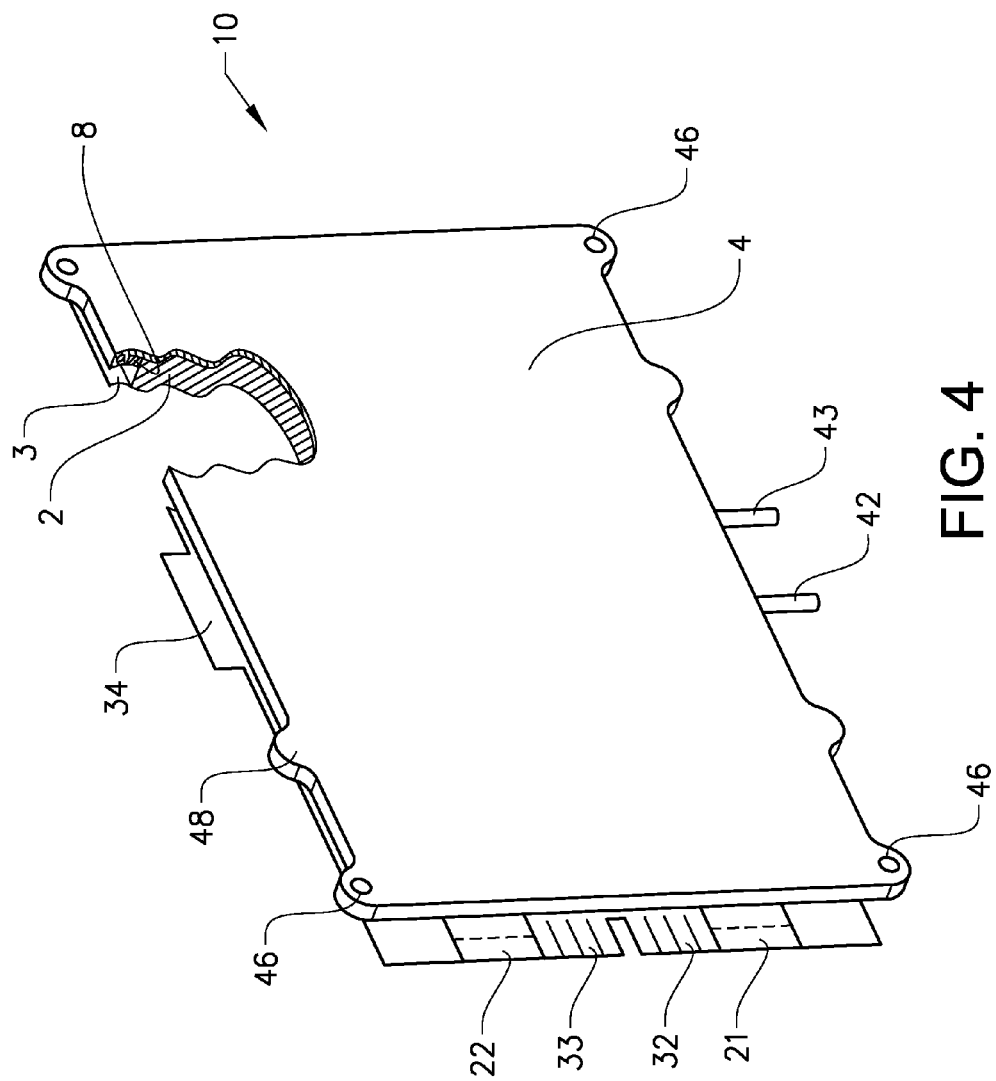
FIG. 4 shows, in an assembled state, the repeating battery pack unit of FIG. 3.
Figure 5:
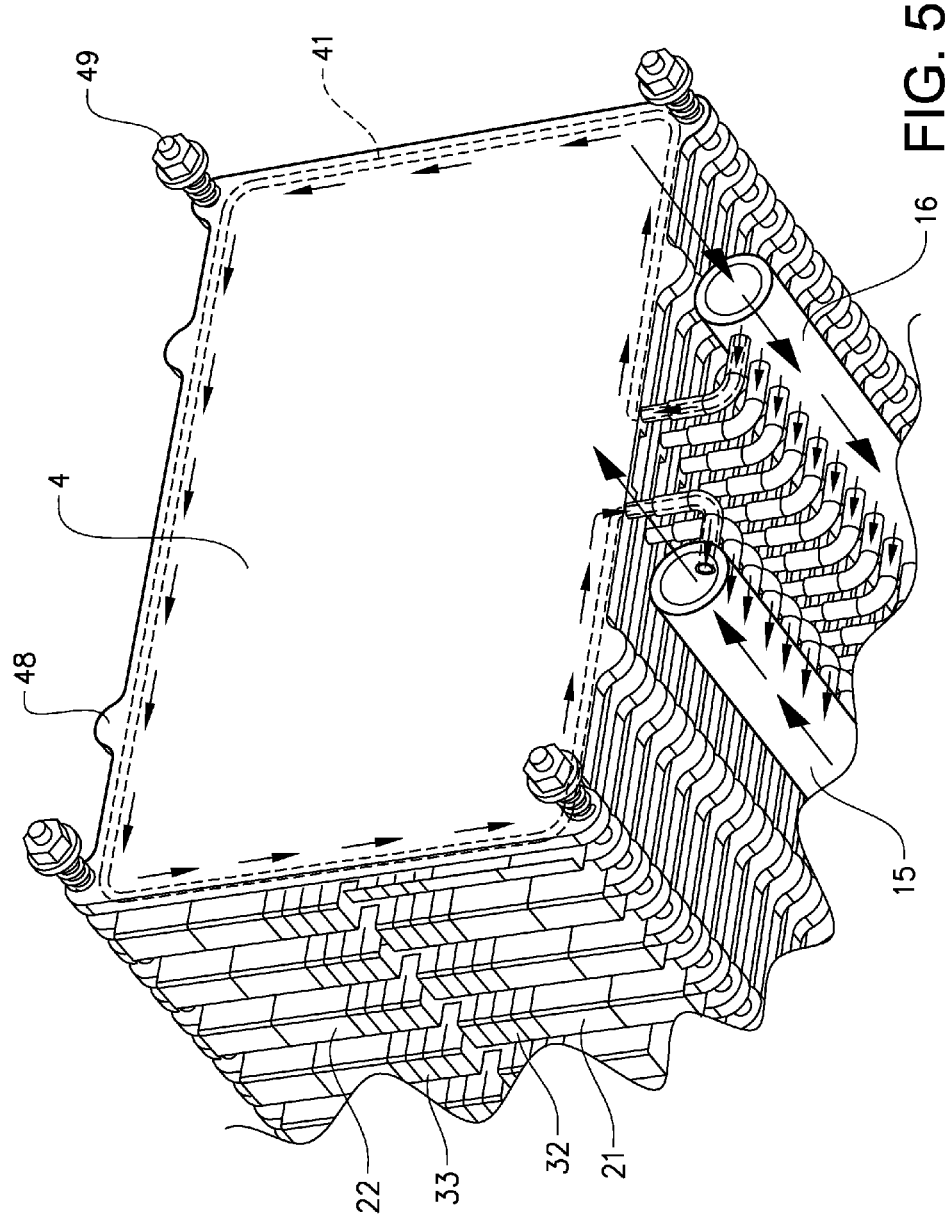
FIG. 5 shows the structure and function of a cooling system of the battery pack of FIG. 1.
Figure 6:
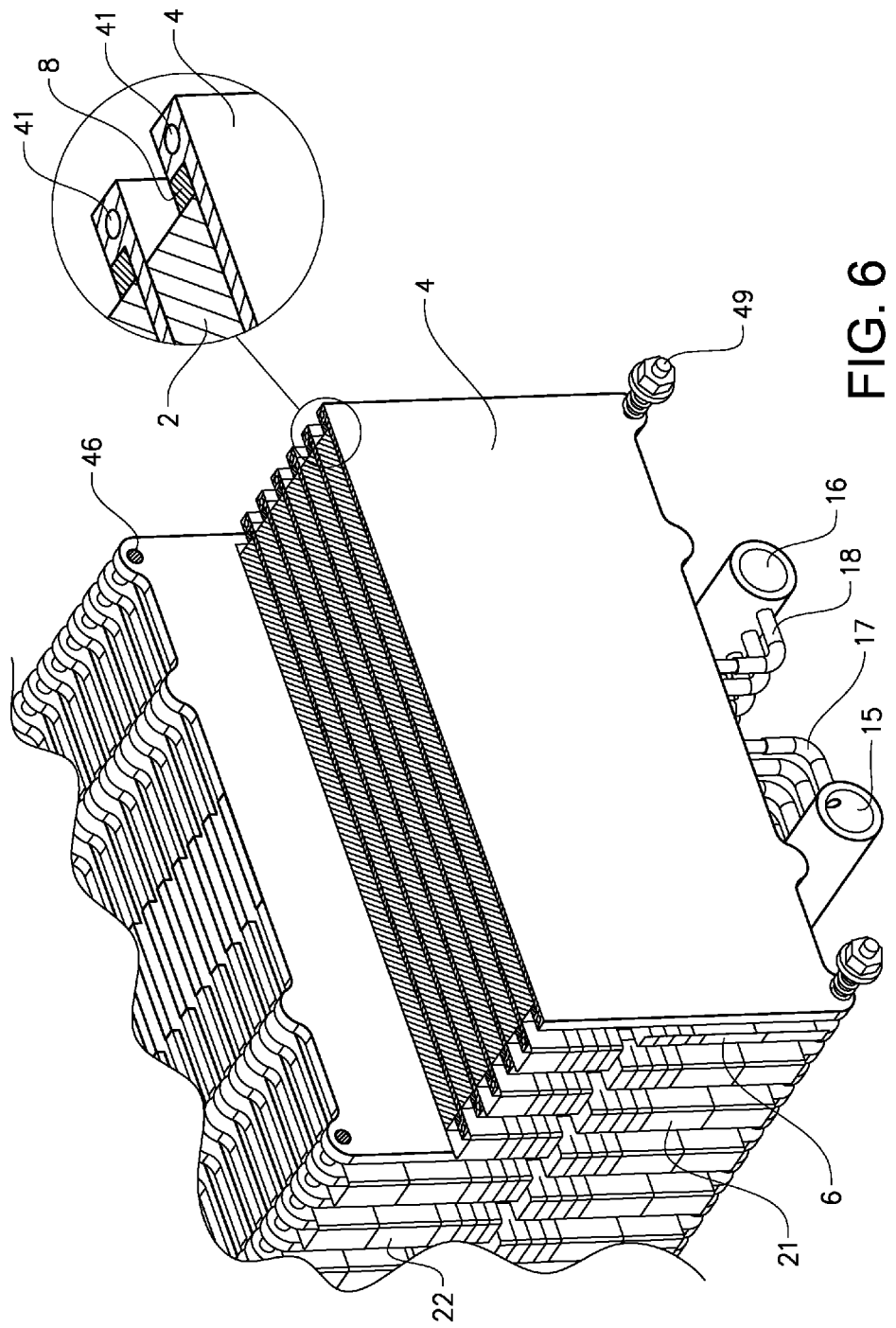
FIG. 6 shows a sectional view of a part of the battery pack of FIG. 1.

FIGS. 1-6 show a first embodiment of a battery pack 1 according to the invention, wherein FIG. 1 shows a front perspective view; FIG. 2 shows a rear perspective view; FIG. 3 shows the parts forming part of a repeating battery pack unit 10 of the battery pack 1; FIG. 4 the repeating battery pack unit 10 in an assembled state; FIG. 5 shows the structure and function of a cooling system of the battery pack; and FIG. 6 shows a sectional view of a part of the battery pack 1.

As can be seen in FIGS. 1-6 the exemplified battery pack 1 comprises a plurality of repeating battery pack units 10 (see FIGS. 3-4). Each battery pack unit 10 forms a layered structure comprising one battery cell 2, one circuit carrying sheet 3 and one cooling plate 4 (FIG. 3) arranged side by side, wherein the cell 2 is arranged in-between the circuit carrying sheet 3 and the cooling plate 4. Each battery pack unit 10 also comprises an elastic sealing frame 8 extending along the edge 2c of the cell 2 that holds the cell 2 in place inside a peripheral region of the cooling plate 4 that has an increased thickness (FIGS. 3, 4 and 6).

The battery pack 1 shown in FIG. 1 is an assembly of around thirty battery pack units 10 where the battery cells 2 are electrically connected in series. The battery pack 1 also includes an end cooling plate 4b. The battery pack 1 has a main cathode (power-minus) 5 and a main anode (power-plus) 6 to which appropriate equipment (not shown) can be connected.

The battery cells 2 are substantially flat with two opposite sides 2a, 2b and a peripheral edge 2c (FIG. 3). The battery cells 2 are arranged side by side with their substantially flat sides 2a, 2b facing each other and form together with the circuit carrying sheets 3 and the cooling plates 4 a layered sandwich structure.

Each battery cell 2 comprises a cell anode and a cell cathode. First and second foldable cell power tabs 21, 22 are connected to the cell anode and cathode, respectively, and protrude at the edge of the battery cell 2. The cell power tabs 21, 22 are folded and connected by welding to corresponding power tabs of adjacent cells 2 as to connect the battery cells 2 electrically to each other, in this case serially.

An electronic arrangement configured to monitor and control the battery cells is realized in the form of a plurality of individual electronic circuit units 30 arranged on each of the circuit carrying sheet 3. Each of the electronic circuit units 30 is thus associated with a corresponding battery cell 2 and is configured to be capable of monitoring and controlling its corresponding battery cell 2. The circuit carrying sheet 3 is thin and flexible and is fastened by means of a self-adhesive layer to one of the sides 2c of the corresponding battery cell 2.

FIG. 3 shows a schematic view of the electronic circuit unit 30 arranged on the circuit carrying sheet 3. What is indicated in FIG. 3 is first and second power connection tabs 31a, 31b, a control unit 35 in the form of a function logic state machine, typically comprising a CPU (Central Processing Unit) or an ASIC (Application Specific Integrated Circuit), a plurality of temperature sensors 36, first and second foldable communication tabs 32, 33 and a resistive balance circuit/tab 34. Further components that may form part of the electronic circuit unit 30 are, for instance, a pressure sensor and/or a heating member capable of heating the corresponding cell 2. Connections between the components, in particular connections from and to the control unit 35, are not shown. It should be noted that FIG. 3 is schematic and in reality the electronic circuit unit 30 may not be visible on the side of the circuit carrying sheet 3 displayed in FIG. 3.

All components and connections of the electronic circuit unit 30 are arranged on the flexible circuit carrying sheet 3 and covered with a protection layer. The circuit carrying sheet 3 is in this case provided with an adhesive layer for attachment to the corresponding battery cell 2. Part of the power connection tabs 31a, 31b and the communication tabs 32, 33 are provided with bare contact surfaces in order to simplify electric connection to the first and second foldable cell power tabs 21, 22 of the corresponding cell 2 and to corresponding communication tabs of adjacent battery pack units 10, respectively. As further described below, the tabs of adjacent battery pack units 10 are folded and welded together.

Each electronic circuit unit 30 is capable of measuring the voltage and the temperature of the corresponding battery cell 2 as well as of controlling the operation of the corresponding cell 2 based on the voltage and temperature measurements. This is possible because the electronic circuit unit 30 comprises the control unit 35 that is connected to the cell anode and cathode (via the power connection tabs 31*a*, 31*b* and the cell power tabs 21, 22) and to the at least one temperature sensor 36, wherein the control unit 35 is capable, by means that are known as such, of measuring the voltage and the temperature of the corresponding battery cell 2 as well as of controlling the operation of the corresponding cell 2 based on voltage and temperature measurements.

Each electronic circuit unit 30 is in this case also capable of communicating with the other electronic circuit units 30 of the battery pack 1 (and/or with further, not shown, equipment communicatively connected to the electronic circuit unit 30). The control unit 35 controls also the communication and the electronic circuit units 30 are connected via the communication tabs 32, 33 that are connected to the control unit 35 of the corresponding electronic circuit unit 30. The communication tabs 32, 33 protrude at an edge of the circuit carrying sheet 3 and the communication tabs 32, 33 are folded and connected to corresponding communication tabs of adjacent electronic circuit units 30.

Without any communicational possibility, the electronic circuit units 30 can only measure voltage and temperature, and e.g. pressure if such a sensor is included, related to their associated battery cell 2, and they can only base their control of its associated cell 2 on these locally determined data.

Although this may be sufficient in some applications, it is normally an advantage if the operation of a particular cell can be based on information on the other cells of the battery pack. The cells 2 of the inventive battery pack 1 may be connected to a central communication unit that communicate with all the cells, as in for instance U.S. Pat. No. 7,479,786. However, by making each electronic circuit unit 30 capable of communicating with the other cells 2 no such central unit is required. In the embodiment of the invention described here, each electronic circuit unit 30 communicates with all other electronic circuit unit 30 and receives thereby information on the other cells 2 as well as sends information on its associated cell 2 to the other electronic circuit units 30.

Predetermined action routines in each of the electronic circuit units 30, i.e. in each of the control units 35, for controlling the associated cell 2 can thus be based on the conditions of all cells 2 in the battery pack 1. The BMS of the present invention may be denoted a distributed BMS.

Main functions of a BMS are to balance the cells, i.e. to keep the energy content among the cells relatively even, and to estimate the SOC (state of charge). Since the SOC typically is a function of temperature, cell voltage and the current through the battery pack, the battery pack 1 preferably comprises a current sensor arranged in communication with the electronic circuit units 30. In the inventive battery pack 1 the individual electronic circuit units 30 can operate independently of each other. Alternatively, one or several of the electronic circuit units 30 can be used as a "master" unit that at least partly controls other electronic circuit units 30.

A further feature of the battery pack 1 is that electrical power connections to each electronic circuit unit 30, to each control unit 35, are arranged both from its corresponding battery cell 2 as well as from at least one additional battery cell, preferably from 3-5 adjacent battery cells. This way it is possible to handle cell failures. If there is no power back-up system the electronic circuit unit 30 of a certain battery pack unit 10 is not capable of communicating a cell failure. These power connections are realized by a number of additional connections that transfer power via the communication tabs 32, 33.

As can be seen in FIGS. 3-4 the circuit carrying sheet 3 extends over the side 2*b* of the battery cell, and in this example the circuit carrying sheet 3 has substantially the same size as its corresponding battery cell 2. The control unit 35 is arranged in the vicinity of the edge 2*c* of the battery cell 2 whereas at least one of the temperature sensors 36 is arranged at a distance from the control unit 35 in a central region of the battery cell 2. This way the control unit 35 can be placed close to the tabs 31*a*, 31*b*, 32, 33, which shortens the connections to the control unit 35, whereas the temperature sensor 36 can be placed as to give a better representation of the temperature of the battery cell 2. In this case several temperature sensors are distributed over the surface of the cell 2 which gives an improved monitoring of the cell temperature.

By arranging a depression in the battery cell 2 at a position corresponding to that of the control unit 35 it can be avoided that this relatively sensitive component becomes subjected to a large pressure between the corresponding cell 2 and the cooling plate 4 of an adjacent battery pack unit 10 positioned on the other side (the rear side in FIG. 4) of the circuit carrying sheet 3. Such a depression may instead, or also, be arranged in the cooling plate 4 of the adjacent battery pack unit 10.

The electronic circuit unit 30 comprises a resistive balance circuit (not shown) controlled by the control unit 35. The resistive balance circuit comprises a resistive copper wiring arranged in the resistive balance tab 34 that protrudes at an edge of the circuit carrying sheet 3 and that is folded around an edge of an adjacent cooling plate to provide for effective cooling. The electronic circuit unit 30 is configured such that an electric current from the corresponding battery cell 2 can be tapped off via the resistive balance circuit such as to lower the voltage of the cell 2. This is form of passive balancing of the battery cell 2. The electronic circuit units 30 may also comprise means for active balancing. In such balancing the energy is transferred via the communication tabs 32, 33.

The electronic circuit unit 30 may also comprise a controllable heating member capable of heating the corresponding cell 2. This can be a copper wiring similar to the resistive balance circuit but arranged as to extend over the circuit carrying sheet 3 and thus over the side 2*b* of the corresponding cell 2 such as to effectively heat the cell 2 if needed.

The electronic circuit unit 30 may also comprise a pressure sensor so that the control unit 35 can detect, and communicate, deviations from normal pressure that, for instance, can occur if the battery pack units 10 expand due to malfunction or abuse.

Flexible films for use as circuit carrying sheets 3 are known as such. Also the components used on each circuit carrying sheet 3 are known as such.

A further feature of the inventive battery pack 1 is that the communication bus, i.e. the bus formed by the connected communication tabs 32, 33, is insulated from the battery pack 1. The internal cell communication is thus realized with an electronic bus, the potential of which is insulated from the potential of the individual cells. This way the internal communication bus can be connected to the battery bus of the vehicle or machine in which the battery pack is installed.

Each cooling plate 4 is provided with an internal cooling channel 41 that extends along the edge of the cooling plate in the peripheral region where the thickness of the cooling plate 4 is larger (see FIG. 6). The cooling channel 41 has an inlet 43 and an outlet 42 in the form of protruding pipe ends arranged on the edge of the cooling plate 4 at an underside thereof. The inlet 43 is connected to a cooling medium supply 16 that extends along the underside of the battery pack 1 and the outlet 42 is connected to a cooling medium discharge 15 that extends in parallel with the cooling medium supply 16 on the same side of the battery pack 1. Connection pipes 17, 18, in this example bent connection pipes, form connections between the inlet/outlet 43/42 and the cooling medium supply/discharge 16/17. A suitable cooling medium is water.

The inlet and outlets 43, 42, the connection pipes 17, 18 and the cooling medium supply/discharge 16/15 can be arranged in different ways. An important thing is that all connections are leak-proof and to simplify manufacturing it should be easy to make the connections leak-proof. In this case sealing is made by welding or using adhesives.

With regard to manufacturing it is an advantage to use the cooling medium supply/discharge 16/17 as a supporting and positioning unit that extends along the length of the battery pack 1 to be manufactured. By designing cooling connections and fittings so that individual battery pack units 10 connected to the cooling medium supply/discharge 16/17 are hold in place, one by one, manufacturing is simplified. In this case this is achieved by using inlets/outlets 43, 42 in the form of pipe ends that protrude from the edge of the cooling plate 4 in a direction parallel to the layers in the layered battery pack 1, and by inserting these pipe ends into the connection pipes 17, 18 (see FIGS. 7A and 7B).

The cooling plates 4 are provided with protrusions 48 that are used for supporting the battery pack 1 when arranged in a casing (not shown).

Each cooling plate 4 is provided with a plurality of through-holes 46 positioned outside of the peripheral edge 2c of the battery cells 2. In this case the holes 46 are placed in one of the protrusions 48 located outside of the cooling channel 41 at each corner of the cooling plate 4. Straight connection rods 47 extend in a direction perpendicular to the plane of the layers in the layered battery pack 1 through corresponding through-holes 46 of the cooling plates 4 (and the end cooling plate 4b) from a first end of the battery pack 1, at the end cooling plate 4b, to a second end, at the battery pack unit 10 opposite to the end cooling plate 4b. Locking devices 49 are arranged at each of said ends of the battery pack 1 at each end part of the connection rods 47 to hold the connection rods 47 in place and to press the layers together in the battery pack 1.

The locking device 49 comprises a compression coil spring 49a that is slipped onto the end part of the connection rod 47 and a screw nut 49b that is screwed onto threads provided on the end part of the connection rod 47 such as to compress the coil spring 49a and thereby press the layered battery pack 1 together. This way the battery pack 1 can be hold together but at the same time the spring 49a allows for some movement and expansion of the battery pack units 10, for instance induced by increased temperature.

A suitable material for the cooling plates 4 is aluminium.

Although the inventive battery pack 1 can be used in most applications it is particularly useful for high-power applications, such as powering of electric or hybrid vehicles. Such applications generally require special arrangements for handling of the heat evolved by the cells 2, in contrast to small battery pack applications for e.g. computers. Also the method of manufacturing the battery pack differs considerably between large, high-power packs and smaller packs.

The battery cells 2 are preferably of the Li-ion type and each battery cell 2 has a capacity of at least 1 Ah, typically at least 10 Ah. The battery pack 1 has typically a capacity of at least 200 Wh; likely output values are 2-50 kWh and 12-400 V.

Figure 7A:
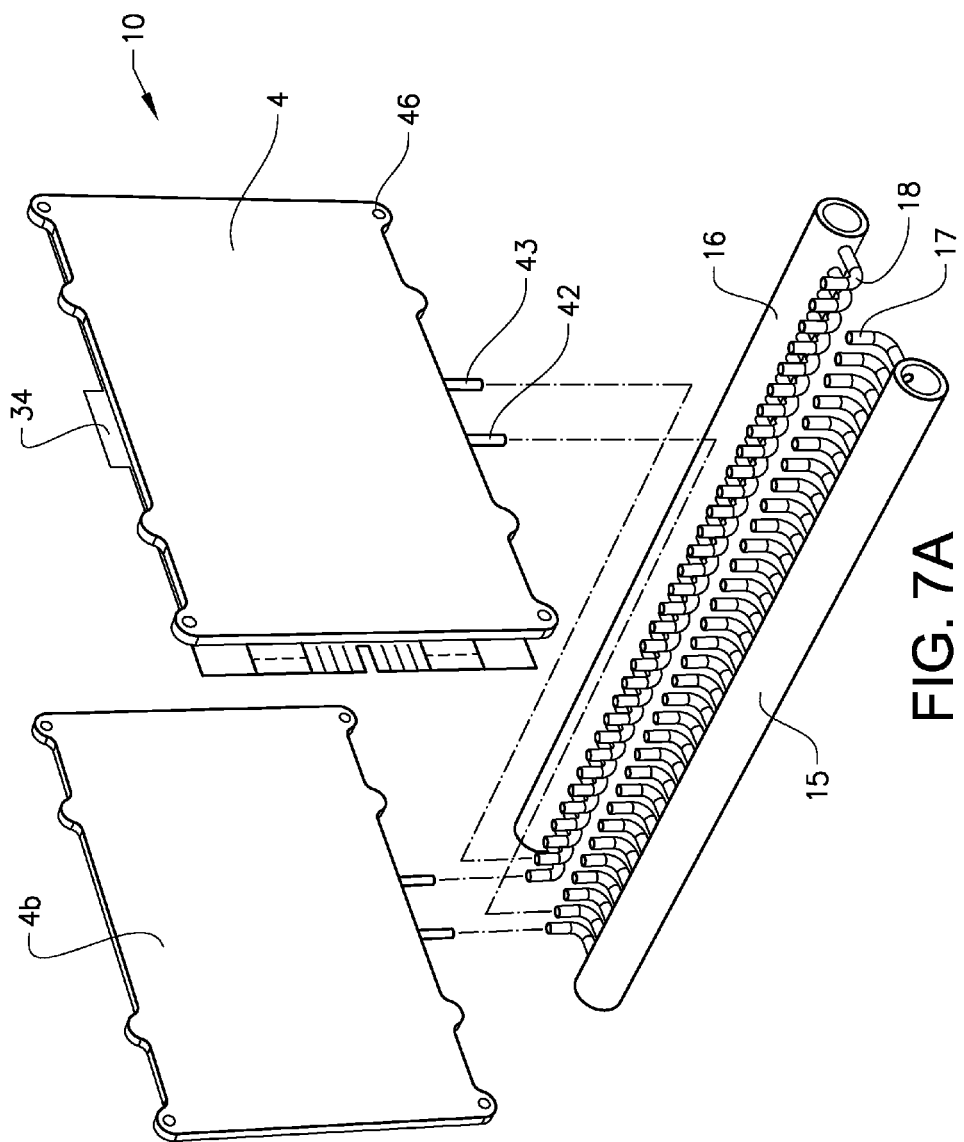
FIG. 7A shows a step of the process of assembling a battery pack according to FIG. 1.
Figure 7C:
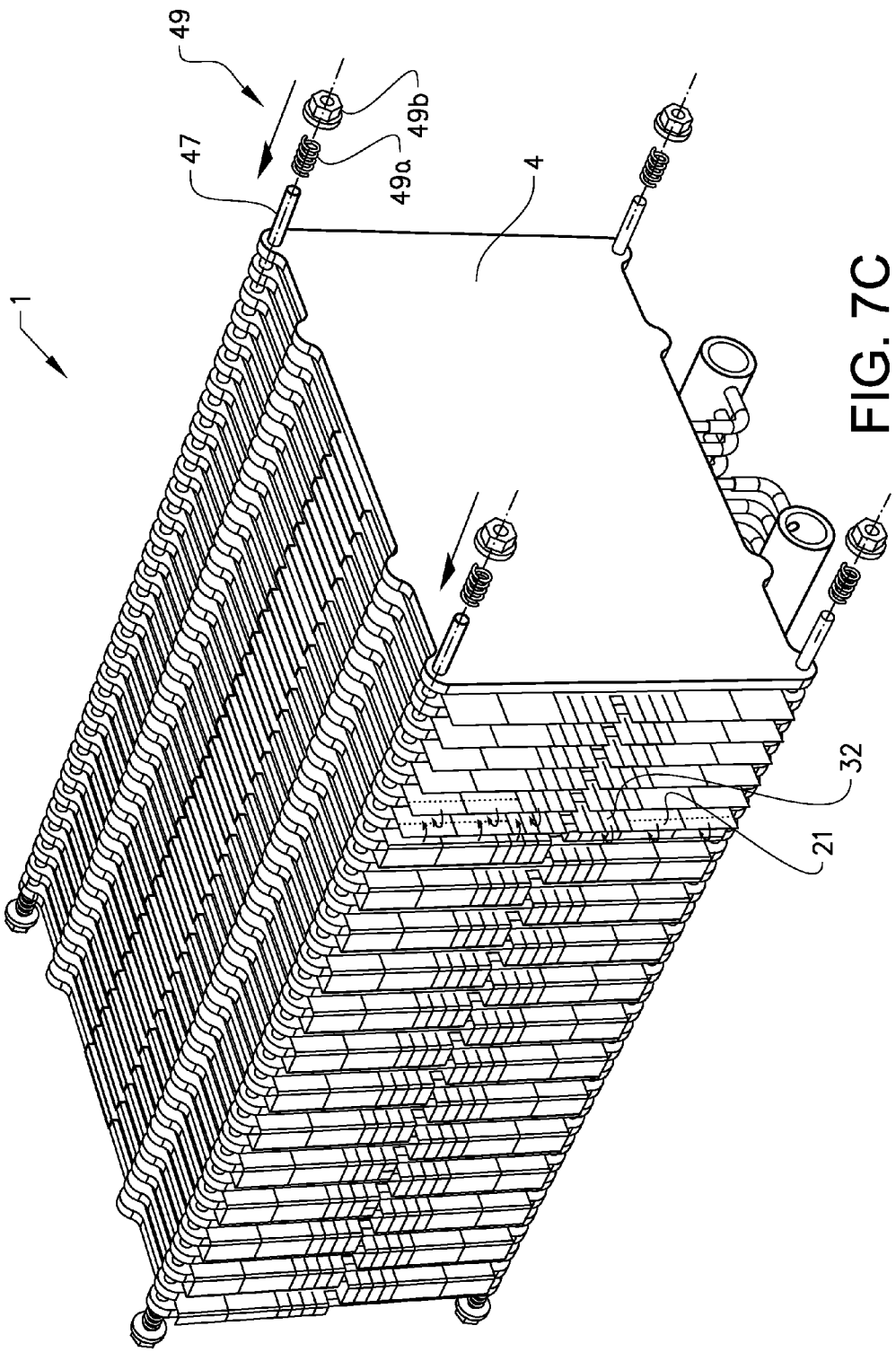
FIG. 7C shows a still further step of the process of assembling a battery pack according to FIG. 1.

FIGS. 7A-7C show steps of the process of assembling the battery pack shown in FIGS. 1-6. FIGS. 3-4 show the step of assembling one of the battery pack units 10 forming part of the battery pack 1.

With reference to FIGS. 3-4 the step of forming a repeating battery pack unit 10 comprises in this example the steps of:
- attaching the circuit carrying sheet 3 to the side 2b of the corresponding battery cell 2 by adhesive means,
- placing the elastic frame sealing 8 onto the cooling plate 4 inside the thicker peripheral region thereof,
- placing the battery cell 2 closely beside the cooling plate 4 inside of the frame sealing 8 (that at his stage is slightly compressed and holds the cell 2 in place).

The above steps may be carried out in a different order and part or all of them may alternatively be carried out when the cooling plate 4 is already arranged in the battery pack 1, i.e. when supported and positioned by the cooling medium supply/discharge 16/15.

With reference to FIGS. 7A-7C the method for manufacturing of the battery pack 1 step comprises in this example the steps of:
- providing and positioning a cooling medium system comprising cooling medium supply and discharge 16, 15 with connection pipes 17, 18,
- positioning the end cooling plate 4b by connecting its inlet 43 and outlet 42 to the corresponding connection pipes 17, 18,
- forming a first of said repeating battery pack unit 10,
- positioning said first battery pack unit 10 by connecting the inlet 43 and outlet 42 of its cooling plate 4 to the corresponding connection pipes 17, 18,
- folding and fastening the resistive balance tab 34 to an adjacent cooling plate 4 (in this case the end cooling plate 4b),
- repeating the previous steps with a plurality of battery pack units 10,
- inserting the connection rods 47 through the corresponding through-holes 46 and attaching the locking devices 49, and
- folding and connecting (by welding) the cell power tabs 21, 22, the power connection tabs 31a, 31b and the communication tabs 32, 33.

This is a simple and efficient method of manufacturing a battery pack. The main steps can be regarded to be the step of forming a plurality of repeating battery pack units 10 of the type described above (which step can be carried out in different ways as described above), and the step of assembling said plurality of repeating battery pack units 10 as to form the battery pack 1.

A step that simplifies the production method is that each cooling plate 4 can be firmly connected to the cooling medium supply and discharge system which holds the cooling plate 4 or the battery cell unit 10 in place and thereby has a supporting and positioning function.

Further advantages of the manufacturing method are mainly related to the fact that the electronics are arranged on the circuit carrying sheet 3 (easy fastening of the sheet 3 to the cell 2, easy handling and connection of the power connection tabs 31a, 31b and the communication tabs 32, 33 forming part of the sheet 3).

The invention is not limited by the embodiments described above but can be modified in various ways within the scope of the claims. For instance, it is not necessary to provide the cooling plates with internal cooling channels or to make use of a circulating cooling medium in the battery pack. The cooling can instead be based on air-cooling of the cooling plates. Various types of cooling fins and/or internal air channels can be arranged onto/in the cooling plates.

If pressure sensors are included these are also connected to the control unit 35. This makes it possible to determine possible cell expansion at an early stage and thereby identify possible mal-function in time to avoid serious problems.

The invention claimed is:

1. Battery pack, comprising:
a plurality of electrically connected battery cells, wherein the battery cells are substantially flat with two opposite sides and a peripheral edge, and wherein the battery cells are arranged side by side as to form a layered structure, and
an electronic arrangement configured to monitor and control the battery cells,
wherein the electronic arrangement comprises a plurality of individual electronic circuit units, each of which being associated with a corresponding battery cell,
wherein each of the electronic circuit units is configured to be capable of monitoring and controlling its corresponding battery cell,
wherein each of the electronic circuit units is configured to be capable of measuring voltage of the corresponding battery cell,
wherein a first electronic circuit unit is configured to communicate with at least a second electronic circuit unit without using a central control unit, and
wherein each of the electronic circuit units is arranged on a thin and flexible circuit carrying sheet that is arranged at one of the sides of the corresponding battery cell.

2. Battery pack according to claim 1,
wherein the battery pack comprises a plurality of cooling plates arranged as layers between battery cells in the layered structure.

3. Battery pack according to claim 2,
wherein the battery pack comprises a plurality of repeating battery pack units, each battery pack unit forming a layered structure comprising one of said battery cells, one of said circuit carrying sheets and one of said cooling plates.

4. Battery pack according to claim 2,
wherein the cooling plates are provided with an internal cooling channel with an inlet and an outlet, wherein the inlet is connected to a cooling medium supply and wherein the outlet is connected to a cooling medium discharge.

5. Battery pack according to claim 2,
wherein each cooling plate is provided with a plurality of through-holes positioned outside of the peripheral edge of the battery cells, wherein a connection rod extends through corresponding through-holes of the cooling plates from a first end of the battery pack to a second end, wherein a locking device at each of said ends of the battery pack is arranged to hold the connection rod in place and to press the layers together in the battery pack.

6. Battery pack according to claim 2,
wherein the cooling plates are made of aluminum.

7. Battery pack according to claim 1,
wherein each battery cell comprises a cell anode and a cell cathode, wherein first and second foldable cell power tabs are connected to the cell anode and cathode, respectively, wherein said cell power tabs protrude at the edge of the battery cell.

8. Battery pack according to claim 7,
wherein the foldable cell power tabs are folded and connected to adjacent cells as to connect the battery cells electrically to each other.

9. Battery pack according to any claim 1,
wherein each battery cell comprises a cell anode and a cell cathode, wherein each of the electronic circuit units is electrically connected to the cell anode and cathode of its corresponding cell.

10. Battery pack according to claim 1,
wherein each of the electronic circuit units is capable of measuring temperature of the corresponding battery cell as well as of controlling the operation of the corresponding cell based on the voltage and temperature measurements.

11. Battery pack according to claim 1,
wherein each of the electronic circuit units comprises a control unit and at least one temperature sensor connected to the control unit, wherein the control unit is capable of measuring the voltage and the temperature of the corresponding battery cell as well as of controlling the operation of the corresponding cell based on the voltage and temperature measurements.

12. Battery pack according to claim 11,
wherein the circuit carrying sheet extends over the side of the battery cell, wherein the control unit is arranged in the vicinity of the edge of the battery cell whereas the temperature sensor is arranged at a distance from the control unit in a central region of the battery cell.

13. Battery pack according to claim 1,
wherein each of the electronic circuit units comprises a controllable heating member capable of heating the corresponding cell.

14. Battery pack according to claim 1,
wherein each of the electronic circuit units comprises a resistive balance circuit, wherein each of the electronic circuit units is configured such that an electric current from the corresponding battery cell can be tapped off via the resistive balance circuit such as to lower the voltage of the cell.

15. Battery pack according to claim 14,
wherein the resistive balance circuit is arranged in a resistive balance tab that protrudes at an edge of the circuit carrying sheet, wherein the resistive balance tab is folded around an edge of an adjacent cooling plate.

16. Battery pack according to claim 1,
wherein the electronic circuit units are connected such as to allow communication between the electronic circuit units of the battery pack.

17. Battery pack according to claim 16,
wherein each circuit carrying sheet comprises first and second foldable communication tabs connected to the corresponding electronic circuit unit, wherein said communication tabs protrude at an edge of the circuit carrying sheet, wherein the communication tabs are folded and connected to adjacent electronic circuit units.

18. Battery pack according to claim 1,
wherein each of the electronic circuit units comprises a pressure sensor.

19. Battery pack according to claim 1,
wherein electrical power connections to each of the electronic circuit units are arranged both from its corresponding battery cell as well as from at least one additional battery cell.

20. Battery pack according to claim 1,
wherein the circuit carrying sheet has substantially the same size as its corresponding battery cell.

21. Battery pack according to claim 1,
wherein the circuit carrying sheet is attached to its corresponding battery cell by an adhesive.

22. Battery pack according to claim 1,
wherein the cells are of the Li-ion type.

23. Battery pack according to claim 1,
wherein each battery cell has a capacity of at least 1 Ah.

24. Battery pack according to claim 1, wherein:
each electronic circuit unit of the plurality of electronic circuit units is configured to receive cell voltages from other electronic circuit units of the plurality of electronic circuit units and, based on the received cell voltages, at least partly control the corresponding battery cell to maintain a substantially even cell charge capacity among the plurality of the battery cells.

25. Battery pack according to claim 1, wherein:
the first or second electronic circuit unit of the plurality of electronic circuit units is configured to receive cell voltages from the plurality of electronic circuit units and, based on the received cell voltages, at least partly control the plurality of electronic circuit units to maintain a substantially even cell charge capacity among the plurality of the battery cells.

26. Method for manufacturing of a battery pack, the method comprising:
providing:
a plurality of electrically connected battery cells, wherein the battery cells are substantially flat with two opposite sides and a peripheral edge, and
a plurality of cooling plates,
wherein the battery cells and the cooling plates are arranged side by side as to form a layered structure,
said battery pack further comprising an electronic arrangement configured to monitor and control the battery cells,
forming a plurality of repeating battery pack units, wherein each battery pack unit forms a layered structure comprising one of said battery cells, one of said cooling plates and a thin and flexible circuit carrying sheet arranged at one of the sides of a corresponding battery cell, said circuit carrying sheet comprising an electronic circuit unit being capable of monitoring and controlling its corresponding battery cell,
wherein the electronic circuit unit is configured to be capable of measuring voltage of the corresponding battery cell, and
wherein a first electronic circuit unit associated with a first battery cell is configured to communicate with at least a second electronic circuit unit associated with a second battery cell without using a central control unit, and
assembling said plurality of repeating battery pack units as to form the battery pack.

27. Method according to claim 26, further comprising:
attaching the circuit carrying sheet to the corresponding battery cell by an adhesive.

28. Method according to claim 26, further comprising:
connecting the electronic circuit unit to the corresponding battery cell by connecting first and second power connection tabs, that form part of the electronic circuit unit and the circuit carrying sheet, with foldable first and second foldable cell power tabs, that are connected to a cell anode and a cell cathode, respectively.

29. Method according to claim 26, further comprising:
establishing a communication arrangement allowing the electronic circuit units in the battery pack to communicate with each other.

30. Method according to claim 29, further comprising:
connecting first and second foldable communication tabs that protrude at an edge of the circuit carrying sheet to corresponding communication tabs of adjacent electronic circuit units.

* * * * *